J. HUTTON.
MACHINE FOR SOWING SEEDS OR THE LIKE.
APPLICATION FILED JAN. 28, 1916.
1,241,387.
Patented Sept. 25, 1917.
2 SHEETS—SHEET 2.
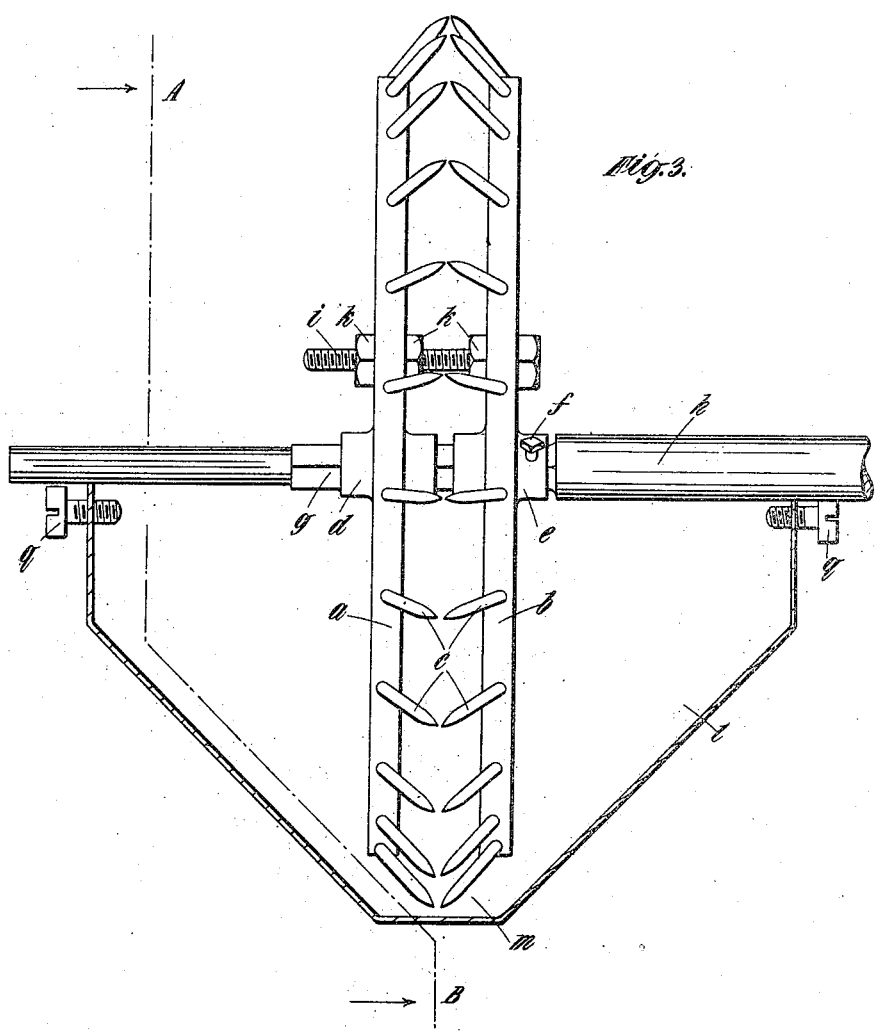
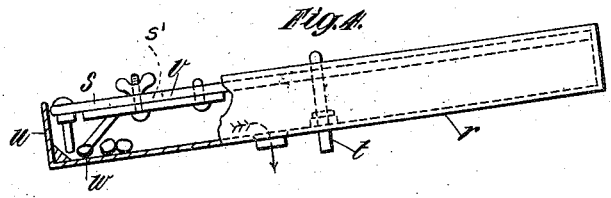
WITNESSES
Frank Logan
A. R. Anderson
INVENTOR.
JOHN HUTTON
BY: H van Dedennel
ATTORNEY.

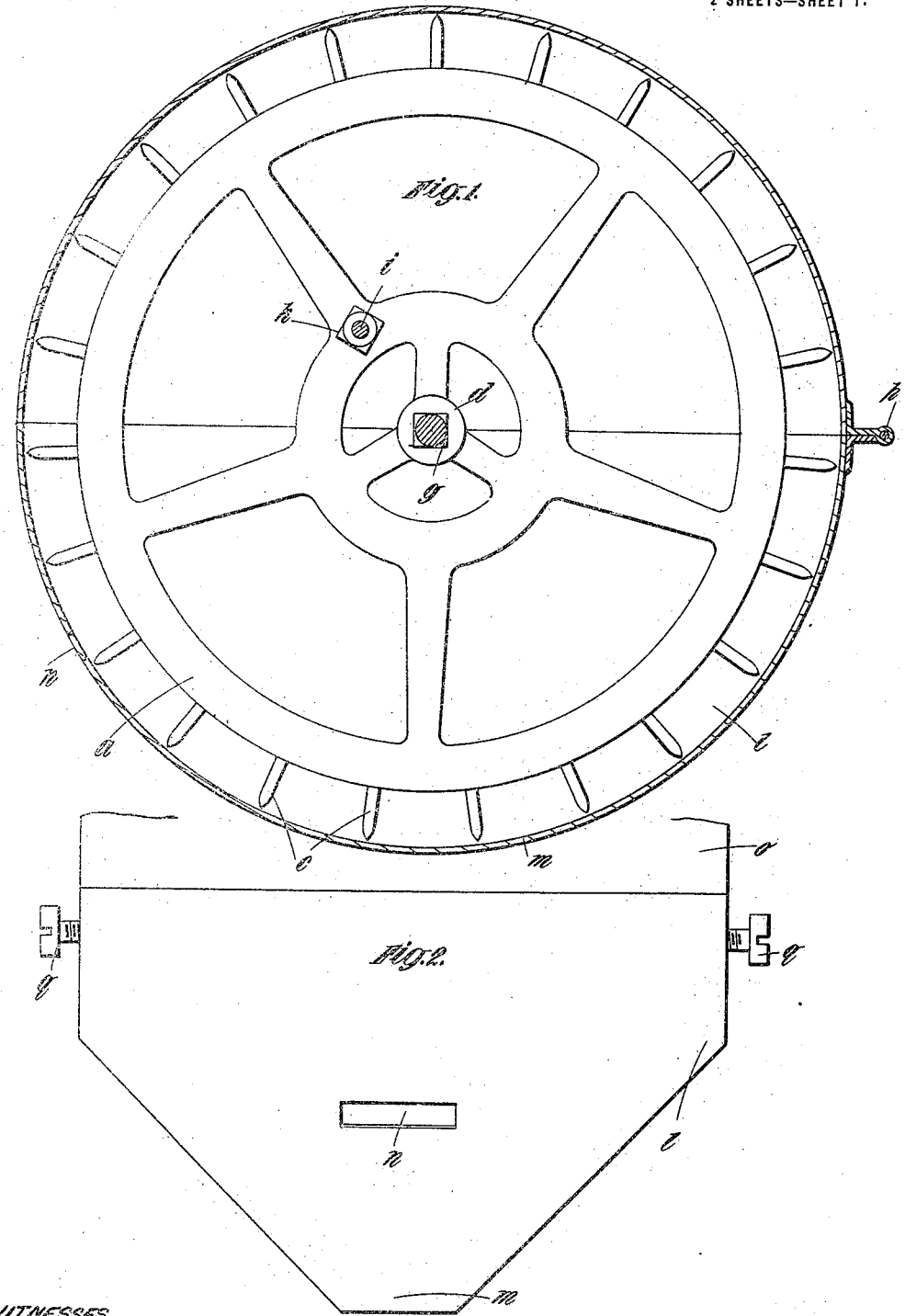

UNITED STATES PATENT OFFICE.

JOHN HUTTON, OF KILMINNING, CRAIL, SCOTLAND.

MACHINE FOR SOWING SEEDS OR THE LIKE.

1,241,387.  Specification of Letters Patent.  Patented Sept. 25, 1917.

Application filed January 28, 1916. Serial No. 74,760.

*To all whom it may concern:*

Be it known that I, JOHN HUTTON, a citizen of the United Kingdom of Great Britain and Ireland, and resident of Kilminning, Crail, Fife, Scotland, have invented certain new and useful Improvements in or Relating to Machines for Sowing Seeds or the like, of which the following is a specification, such as will enable others skilled in the art to which it appertains to make and use the same.

This invention relates to machines for planting or sowing seeds and has for its object to provide an improved machine for delivering the seeds one at a time at predetermined intervals.

In the improved machine according to this invention two series of arms movable in a box having a suitably prepared surface, are adapted to push the seeds over said surface to a discharge opening, the two series of arms being adjustable with respect to one another to sow seeds of different sizes.

The arms may be mounted on wheels capable of being adjusted toward or away from one another and may be integral with the wheels or may be secured thereto in any suitable manner. The wheels may be used in pairs and the arms on one wheel should be arranged opposite the arms on the other wheel.

In order that the invention may be clearly understood, reference will now be made to the accompanying drawings wherein two examples of my machine are shown.

Figure 1 is a sectional view on the line A—B of Fig. 3.

Fig. 2 is an end view of the box.

Fig. 3 is a view partly in section showing the wheels mounted in the said box, and Fig. 4 is a view of a modification.

Referring to the drawings $l$ represents the box in which the seeds are placed. This box may be of the shape shown in Figs. 2 and 3. The box has a suitably prepared part $m$ of brass or other suitable material which may have a smooth and preferably polished surface. This part $m$ may be connected to the sides of the box, and the box may be provided with a suitable cover, and have means such as screws $q$ whereby it may be attached to any suitable machine. An opening $n$ is provided through which the seeds are delivered.

The box supports a shaft $h$ which has a square portion $g$.

On the square portion $g$ are mounted two wheels $a$, $b$, having bosses $d$ and $e$ to give extended bearings for the wheels. The bosses of the wheels should engage rather tightly the portion $g$ so that there will be no rotary movement of the wheels relatively to the shaft, but should be capable of being moved longitudinally thereon.

One of the wheels, for example the wheel $b$, is provided with means such as a screw $f$ for securing the wheel to the portion $g$.

Suitable holes are formed in the wheels to receive a screw $i$ having nuts $k$ thereon to clamp the wheels together. It will therefore be understood that both wheels rotate together and can be moved toward or away from one another as desired, for a purpose to be hereinafter described.

Each wheel is provided with arms $c$, and the arms on one wheel should be located exactly opposite the arms on the other wheel so that when the two wheels are brought together and the points of two opposite arms are in contact, all the other arms of the one wheel should be in contact with the opposite arms on the other wheel.

The arms should be located close to the portion $m$ but should not touch.

The machine is operated in the following manner.

The seeds are placed in the box $l$ and the shaft $h$ rotated in any suitable manner. As the shaft is rotated the points of the opposite arms are adapted to push a seed over or along the portion $m$ to the opening $n$ where it is discharged and falls to the ground. As the shaft $h$ is being rotated the machine to which the box $l$ is secured is moved over the ground so that the seeds are delivered at predetermined intervals.

The wheels can be brought closer together or moved farther apart so as to take up seeds of different sizes.

If desired any number of pairs of wheels may be mounted on the shaft so that the seeds may be sown in different drills one at a time.

The seeds may also be brought to the discharge opening by means of arms movable on an inclined plane, as shown in Fig. 4. In this case the box $r$ containing the seeds is arranged at an incline. An axle $t$ in the box carries a disk-shaped wheel $s$ having arranged near the circumference thereof a number of arms $u$. The disk also carries a series of bars one of which is designated by $v$. Each of the bars carries an arm $w$ adapted to coöperate with one of arms $u$ and push the seeds to a discharge opening indicated by an arrow in the box $r$. The bars $v$ are secured to the disk $s$ by bolts and nuts, the said bolts passing through slots $s'$ in the disk whereby the said bars $v$ and arms $w$ may be moved toward and away from the arms $u$ as desired so as to sow seeds of different sizes. It will be understood that as the wheel $s$ is rotated the seeds are pushed by the arms $u$ and $w$ to the discharge opening in the box $r$, said opening being arranged in any convenient position.

If desired the seeds may be conveyed from the discharge opening through a tube to the ground.

The machine may be used for sowing seeds such as peas, turnips, clover seed or any seeds that are of a somewhat similar spherical shape, or for planting potatoes.

What I claim and desire to secure by Letters Patent is:—

1. In a machine for sowing seeds at predetermined intervals, a box having a seed-discharge opening, two series of coöperating arms rotatably mounted in said box for conveying seeds to the opening, and means for relatively adjusting the two series of arms, to sow seeds of different sizes.

2. In a machine for sowing seeds at predetermined intervals, a box having a seed-discharge opening, two wheels rotatably mounted in said box and having arms coöperating to push seeds to the opening, and means for relatively adjusting the two wheels.

3. In a machine for sowing seeds at predetermined intervals, a box having a seed-discharge opening, a shaft rotatably mounted in said box, two wheels within the box and rotatable with the shaft, means for relatively adjusting the distance between the wheels, and arms carried by the wheels and coöperating to push seeds to said opening.

In witness whereof I have hereunto set my hand in presence of two witnesses.

JOHN HUTTON.

Witnesses:
  HELEN SUTHERLAND,
  GEDDES WHITELAW.

Copies of this patent may be obtained for five cents each, by addressing the "Commissioner of Patents, Washington, D. C."